United States Patent
Loh et al.

(10) Patent No.: US 9,098,417 B2
(45) Date of Patent: Aug. 4, 2015

(54) PARTITIONING CACHES FOR SUB-ENTITIES IN COMPUTING DEVICES

(71) Applicant: Advanced Micro Devices, Sunnyvale, CA (US)

(72) Inventors: Gabriel H. Loh, Bellevue, WA (US); Jaewoong Sim, Atlanta, GA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 155 days.

(21) Appl. No.: 13/713,166

(22) Filed: Dec. 13, 2012

(65) Prior Publication Data

US 2014/0173211 A1    Jun. 19, 2014

(51) Int. Cl.
 *G06F 12/08* (2006.01)

(52) U.S. Cl.
 CPC ........ *G06F 12/0842* (2013.01); *G06F 12/0888* (2013.01); *G06F 12/0811* (2013.01); *G06F 2212/1016* (2013.01); *G06F 2212/6042* (2013.01)

(58) Field of Classification Search
 None
 See application file for complete search history.

(56) References Cited

U.S. PATENT DOCUMENTS

| | | | | |
|---|---|---|---|---|
| 5,394,531 A * | 2/1995 | Smith | | 711/136 |
| 5,499,354 A * | 3/1996 | Aschoff et al. | | 711/129 |
| 2002/0002657 A1 * | 1/2002 | Sturges et al. | | 711/129 |
| 2002/0007442 A1 * | 1/2002 | Farrall et al. | | 711/134 |
| 2003/0065886 A1 * | 4/2003 | Olarig et al. | | 711/129 |
| 2003/0093622 A1 * | 5/2003 | Desota et al. | | 711/129 |
| 2003/0196041 A1 * | 10/2003 | Sturges et al. | | 711/129 |
| 2005/0080994 A1 * | 4/2005 | Cohen et al. | | 711/118 |
| 2005/0268037 A1 * | 12/2005 | Hama et al. | | 711/118 |
| 2006/0184740 A1 * | 8/2006 | Ishikawa et al. | | 711/129 |
| 2007/0033341 A1 * | 2/2007 | Hashimoto et al. | | 711/113 |
| 2008/0140937 A1 * | 6/2008 | Nalawade et al. | | 711/119 |
| 2008/0177975 A1 * | 7/2008 | Kawamura | | 711/173 |
| 2008/0270692 A1 * | 10/2008 | Cochran et al. | | 711/114 |

OTHER PUBLICATIONS

M. Qureshi and Y. Patt, "Utility-based Cache Partitioning: A Low-Overhead, High-Performance, Runtime Mechanism to Partition Shared Caches," in the Int'l Symp. on Microarchitecture, 2006.
J. Lee and H. Kim, "TAP: A TLP-Aware Cache Management Policy for a CPU-GPU Heterogeneous Architecture," in the Int'l Symp. on High-Performance Computer Architecture, 2012.

* cited by examiner

*Primary Examiner* — Daniel Bernard
(74) *Attorney, Agent, or Firm* — Park, Vaughan, Fleming & Dowler LLP

(57) ABSTRACT

Some embodiments include a partitioning mechanism that partitions a cache memory into sub-partitions for sub-entities. In the described embodiments, the cache memory is initially partitioned into two or more partitions for one or more corresponding entities. During a partitioning operation, the partitioning mechanism is configured to partition one or more of the partitions in the cache memory into two or more sub-partitions for one or more sub-entities of a corresponding entity. A cache controller then uses a corresponding sub-partition for memory accesses by the one or more sub-entities.

21 Claims, 3 Drawing Sheets

PARTITIONING CACHES FOR SUB-ENTITIES IN COMPUTING DEVICES

BACKGROUND

1. Field

The described embodiments relate to caches in computing devices. More specifically, the described embodiments relate to a technique for partitioning caches in computing devices.

2. Related Art

Many modern computing devices (e.g., laptop/desktop computers, smart phones, set-top boxes, appliances, etc.) include processing subsystems with one or more caches. Caches are generally smaller, fast-access memory circuits located in or near the processing subsystem that can be used to store data that is retrieved from higher levels of a memory hierarchy in the computing device (i.e., other, larger caches and/or memories) to enable faster access to the stored data.

In these computing devices, and particularly computing devices with multiple processing subsystems (e.g., central processing unit cores), processing subsystems can contend with one another for space in the cache, with processing subsystems overwriting data in the cache that other processing systems would have used. To avoid the inefficiency inherent in contending for space in the cache, in some computing devices, the caches are partitioned (or divided) and processing subsystems are granted protected access to corresponding portions of the cache. However, even in systems where the caches are configured in this way, processing system sub-entities such as software threads and functional blocks (instruction fetch units, execution units, etc.) can contend with one another within the portion of the cache allocated to the processing subsystem, leading to inefficient operation.

SUMMARY

Some embodiments include a partitioning mechanism that partitions a cache memory into sub-partitions for sub-entities. In the described embodiments, the cache memory is initially partitioned into two or more partitions for one or more corresponding entities. During a partitioning operation, the partitioning mechanism is configured to partition one or more of the partitions in the cache memory into two or more sub-partitions for one or more sub-entities of a corresponding entity. A cache controller then uses a corresponding sub-partition for memory accesses by the one or more sub-entities.

In some embodiments, the partitioning mechanism is configured to allocate the two or more sub-partitions for a corresponding partition based on at least one of: (1) a memory access pattern of at least one of the one or more sub-entities; and (2) a property of at least one of the one or more sub-entities.

In some embodiments, when allocating the two or more sub-partitions for the corresponding partition based on a memory access pattern of at least one of the one or more sub-entities, the partitioning mechanism is configured to, for each of the one or more sub-entities, determine at least one of a number of memory accesses performed by the sub-entity and a number of misses encountered by the sub-entity. Based on the at least one of the number of memory accesses and the number of misses for each of the one or more sub-entities, the partitioning mechanism is configured to set a sub-partition size for each of the two or more sub-partitions.

In some embodiments, the partitioning mechanism is configured to maintain at least one of a first record of memory accesses made in the cache memory for a given sub-entity and a second record of misses that occur in the cache memory for memory accesses for the given sub-entity. In these embodiments, when determining the at least one of the number of memory accesses performed by the given sub-entity and the number of misses encountered by the given sub-entity, the partitioning mechanism is configured to obtain the number of memory accesses and the number of misses from the corresponding first record or second record.

In some embodiments, the partitioning mechanism is configured to use the at least one of the number of memory accesses and the number of misses to characterize the memory access pattern of the given sub-entity. In some embodiments, when setting the sub-partition size for the given sub-entity, the partitioning mechanism is configured to set the sub-partition size for the given sub-entity based on the characterization of the memory access pattern for the given sub-entity.

In some embodiments, the partitioning mechanism is configured to determine that a first sub-entity has performed a predetermined number of memory reads in a sub-partition for a second sub-entity. In these embodiments, the partitioning mechanism is configured to enable the first sub-entity to use a combination of the sub-partition for the first sub-entity and the sub-partition for the second sub-entity.

In some embodiments, at least one predetermined time after partitioning one or more of the partitions in the cache memory into two or more sub-partitions, the partitioning mechanism is configured to update the allocation of the two or more sub-partitions for a corresponding partition based on at least one memory access pattern of the one or more sub-entities. In some embodiments, the partitioning mechanism is configured to perform at least one of the partitioning or the updating of the allocation of the two or more sub-partitions after a startup operation for the cache memory has completed and the cache memory is available for performing memory accesses.

In some embodiments, the one or more entities are selected from the group consisting of a core in a central processing unit (CPU) and a core in a graphics processing unit (GPU). In some embodiments, the sub-entities comprise, in a corresponding entity, one or more functional blocks or one or more software threads operating on the entity.

In some embodiments, when using a corresponding sub-partition for memory accesses by the one or more sub-entities, the cache controller is configured to prevent a given sub-entity from evicting cache blocks from another sub-entity's sub-partition that were stored there by the other sub-entity.

BRIEF DESCRIPTION OF THE FIGURES

Throughout the figures and the description, like reference numerals refer to the same figure elements.

DETAILED DESCRIPTION

Figure 1:
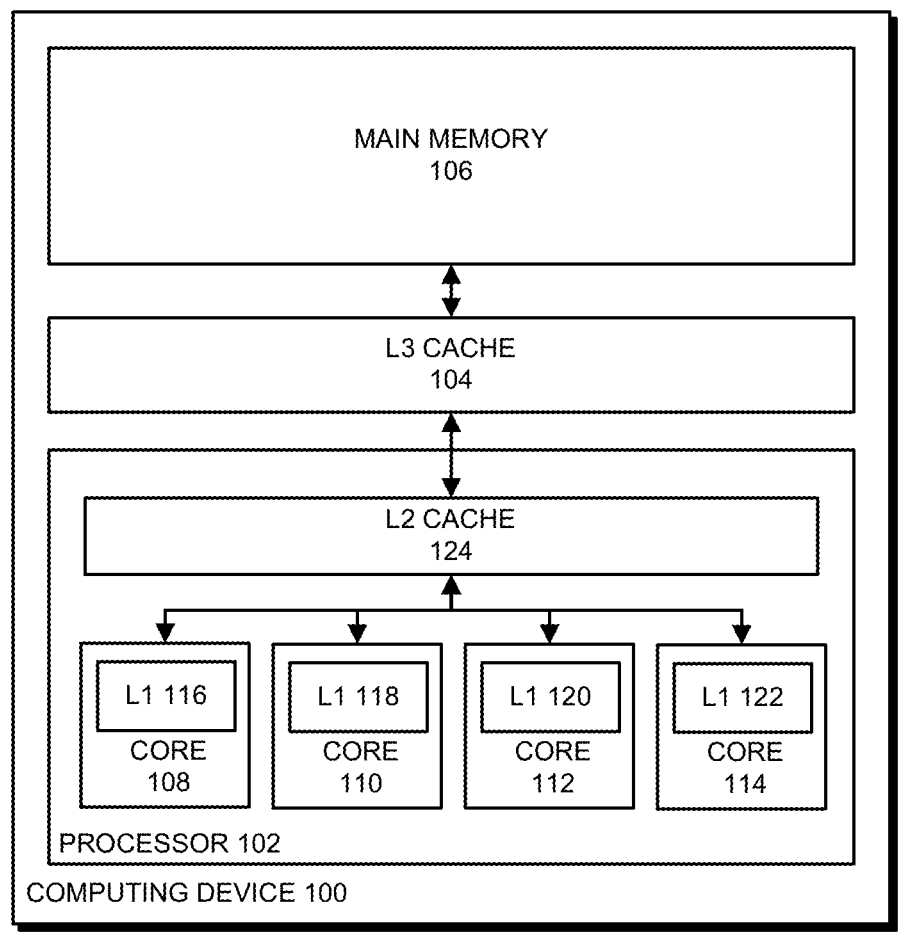
FIG. 1 presents a block diagram illustrating a computing device in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

In some embodiments, a computing device (e.g., computing device 100 in FIG. 1) uses code and/or data stored on a computer-readable storage medium to perform some or all of the operations herein described. More specifically, the computing device reads the code and/or data from the computer-readable storage medium and executes the code and/or uses the data when performing the described operations.

A computer-readable storage medium can be any device or medium or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/processor cores/central processing units (CPUs), application-specific integrated circuit (ASIC) chips, field-programmable gate arrays (FPGAs), caches/cache controllers, embedded processors, graphics processors (GPUs)/graphics processor cores, pipelines, and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In the following description, functional blocks may be referred to in describing some embodiments. Generally, functional blocks include one or more circuits (and, typically, multiple interrelated circuits) that performs the described operations. In some embodiments, the circuits in a functional block include complex circuits that execute program code (e.g., machine code, firmware, etc.) to perform the described operations.

Overview

The described embodiments include entities and sub-entities that access a cache memory (or cache). As examples, the entities can be central processing unit (CPU) cores and graphics processing unit (GPU) cores, and the sub-entities can be functional blocks in an entity or software threads operating on the entity. The described embodiments also include a partitioning mechanism that partitions one or more partitions in the cache into two or more sub-partitions for accesses by one or more sub-entities of a corresponding entity. In other words, in the described embodiments, the partitioning mechanism (or another mechanism) has already partitioned the cache by allocating portions of the cache (e.g., ways in the cache) to one or more entities as partitions of the cache that are reserved for use by the one or more entities. The partitioning mechanism subsequently partitions at least one of the partitions into two or more sub-partitions by allocating at least one sub-partition of the allocated portion to a sub-entity of the corresponding entity (e.g., by allocating one or more ways from the corresponding entity's partition to the sub-entity). For example, when the entity is a GPU and the sub-entities include a color unit and a Z/depth unit, two or more ways in the cache can be allocated to the GPU as a partition, and the two or more ways in the partition can be allocated to the color unit and Z/depth unit as sub-partitions.

In the described embodiments, the partitioning mechanism allocates the two or more sub-partitions for a corresponding partition based on at least one of: (1) memory access patterns of the one or more sub-entities; and (2) properties of one or more sub-entities. For example, when a given sub-entity is performing a large number of memory accesses in the cache, the sub-entity can be allocated a larger portion of the partition than another sub-entity that is performing a smaller number of accesses in the cache. As another example, a high-priority sub-entity can be allocated a larger portion of the partition than a lower-priority sub-entity.

In the described embodiments, when a portion of a partition has been allocated (as a sub-partition) to a sub-entity, a cache controller protects cache blocks placed in the sub-partition by the sub-entity. This includes preventing other sub-entities (and entities) from evicting any cache blocks placed in the sub-partition by the sub-entity.

By partitioning the cache into sub-partitions and protecting a sub-entity's access to the sub-partition in this way, the described embodiments enable sub-entities to have access to portions of the cache that are suited to the operations being performed by each of the sub-entities. This can enable faster return of data and/or more efficient use of the cache as a whole.

Computing Device

FIG. 1 presents a block diagram illustrating a computing device 100 in accordance with some embodiments. As can be seen in FIG. 1, computing device 100 includes processor 102, L3 cache 104, and main memory 106. Processor 102 is generally a device that performs computational operations in computing device 100. Processor 102 includes four processor cores 108-114, each of which includes a computational mechanism such as a central processing unit (CPU), a graphics processing unit (GPU), and/or an embedded processor.

Processor 102 also includes cache memories (or "caches") that can be used for storing instructions and data that are used by processor cores 108-114 for performing computational operations. As can be seen in FIG. 1, the caches in processor 102 include a level-one (L1) cache 116-122 (e.g., "L1 116") in each processor core 108-114 that is used for storing instructions and data for use by the processor core. Generally, L1 caches 116-122 are the smallest of a set of caches in computing device 100 (e.g., 96 kilobytes (KB) in size) and are located closest to the circuits (e.g., execution units, instruction fetch units, etc.) in the processor cores 108-114 that use the instructions and data that are stored in the L1 caches 116-122. The closeness of the L1 caches 116-122 to the corresponding circuits enables the fastest access to the instructions and data stored in the L1 caches 116-122 from among the caches in computing device 100.

Processor 102 also includes a level-two (L2) cache 124 that is shared by processor cores 108-114 and hence is used for storing instructions and data for all of the sharing processor cores 108-114. Generally, L2 cache 124 is larger than the L1 caches 116-122 (e.g., 2048 KB in size) and is located outside, but close to, processor cores 108-114 on the same semiconductor die as the processor cores 108-114. Because L2 cache 124 is located outside the processor cores 108-114 but on the same die, access to the instructions and data stored in L2 cache 124 is slower than accesses to the L1 caches, but faster than accesses to L3 cache 104 in computing device 100.

Returning to computing device 100, the largest of the caches in computing device 100 (at e.g., 16 MB in size), level-three (L3) cache 104 is shared by the processor cores 108-114 and hence is used for storing instructions and data for all of the processor cores. As can be seen in FIG. 1, L3 cache 104 is located external to processor 102 (e.g., on a different die or dies than processor 102), accordingly, accessing data and instructions in L3 cache 104 is typically slower than accessing data and instructions in the lower-level caches.

In some embodiments, each of L1 caches 116-122, L2 cache 124, and L3 cache 104 (collectively, "the caches") include memory circuits that are used for storing cached data and instructions. For example, the caches may include one or more of static random access memory (SRAM), embedded dynamic random access memory (eDRAM), DRAM, double data rate synchronous DRAM (DDR SDRAM), and/or other types of memory circuits.

Main memory 106 comprises memory circuits that form a "main memory" of computing device 100. Main memory 106 is used for storing instructions and data for use by the processor cores 108-114 on processor 102. In some embodiments, main memory 106 is fabricated from memory circuits such as one or more of DRAM, SRAM, DDR SDRAM, and/or other types of memory circuits.

Taken together, L1 caches 116-122, L2 cache 124, L3 cache 104, and main memory 106 form a "memory hierarchy" in and for computing device 100. Each of the caches and main memory 106 are regarded as levels of the memory hierarchy, with the higher levels including the larger caches and main memory 106. Within computing device 100, memory requests are preferentially handled in the level of the memory hierarchy that results in the fastest and/or most efficient operation of computing device 100.

Although embodiment are described with a particular arrangement of processor cores, some embodiments include a different number and/or arrangement of processor cores. For example, some embodiments have only one processor core (in which case the caches are used by the single processor core), while other embodiments have two, six, eight, or another number of processor cores—with the cache hierarchy adjusted accordingly. Generally, the described embodiments can use any arrangement of processor cores that can perform the operations herein described.

Additionally, although embodiments are described with a particular arrangement of caches, some embodiments include a different number and/or arrangement of caches. For example, the caches (e.g., L1 caches 116-122, etc.) can be divided into separate instruction and data caches. Additionally, L2 cache 124 may not be shared in the same was as shown, and hence may only be used by a single processor core, two processor cores, etc. (and hence there may be multiple L2 caches 124 in processor 102). As another example, some embodiments include different levels of caches, from only one level of cache to multiple levels of caches, and these caches can be located in processor 102 and/or external to processor 102. Generally, the described embodiments can use any arrangement of caches that can perform the operations herein described.

Moreover, although computing device 100 and processor 102 are simplified for illustrative purposes, in some embodiments, computing device 100 and/or processor 102 include additional mechanisms for performing the operations herein described and other operations. For example, computing device 100 and/or processor 102 can include power controllers, mass-storage devices such as disk drives or large semiconductor memories (as part of the memory hierarchy), batteries, media processors, input-output mechanisms, communication mechanisms, networking mechanisms, display mechanisms, etc.

Cache

Figures 2, 3:
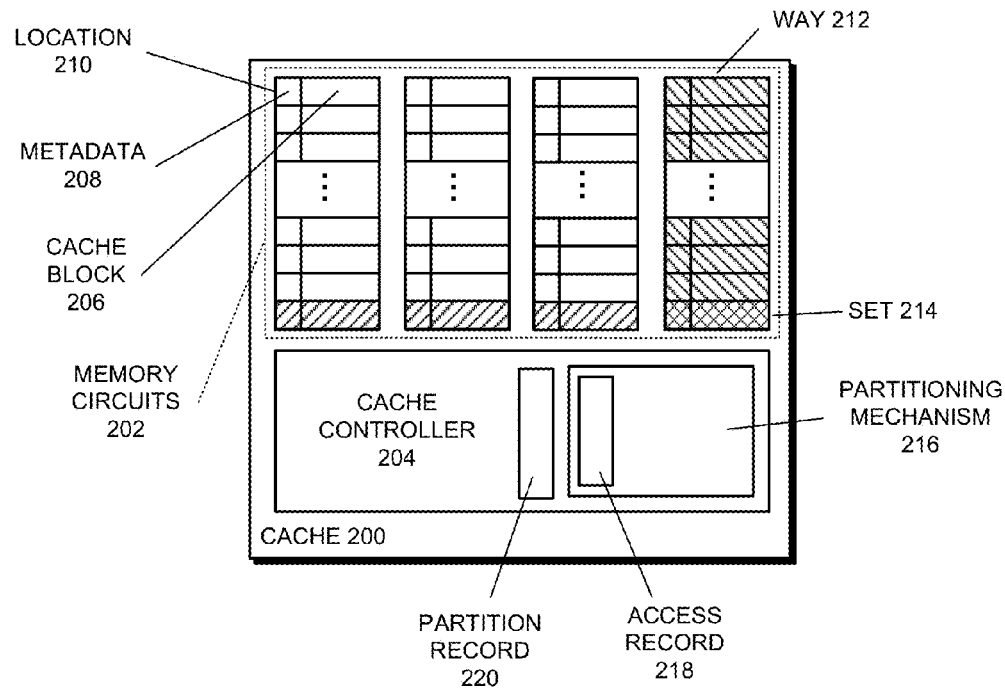
FIG. 2 presents a block diagram illustrating a cache in accordance with some embodiments.
FIG. 3 presents examples of writing data to a cache after the allocation of ways to sub-entities during a partitioning operation in accordance with some embodiments.

FIG. 2 presents a block diagram illustrating a cache 200 in accordance with some embodiments. Cache 200 is a general example of an internal configuration that may be implemented in any of the caches in the described embodiments. For example, some or all of L1 caches 116-122, L2 cache 124, and L3 cache 104 can have, but are not required to have, internal configurations similar to cache 200.

As can be seen in FIG. 2, cache 200 includes memory circuits 202 and cache controller 204. Cache controller 204 is a functional block that performs various functions for controlling operations in cache 200. For example, cache controller 204 can manage storing cache blocks to, invalidating cache blocks in, and evicting cache blocks from cache 200; can perform lookups for cache blocks in cache 200; can handle coherency operations for cache 200; and/or can respond to requests for cache blocks from cache 200.

Memory circuits 202 (interchangeably called "memory" in cache 200) include one or more of SRAM, eDRAM, DRAM, DDR SDRAM, and/or other types of memory circuits that are divided into a set of locations, each location configured to store a cache block and metadata that includes information about the cache block (tags, indicators, flags, etc.). A cache block 206 and corresponding metadata 208 are labeled for example location 210 in cache 200. In some embodiments, each cache block comprises a cache line (although other embodiments can use different-sized cache blocks).

As described above, the memory in the caches in computing device 100 is limited (e.g., to 96 KB for L1 caches 116-122, 2048 KB for L2 cache 124, etc.), and so every cache block that may be loaded from main memory 106 cannot be simultaneously stored in a given cache. Instead, locations in the caches are shared, and therefore made available for storing cache blocks from various addresses in memory. In the described embodiments, any of a number of techniques can be used for managing the storage of cache blocks in the limited memory in the caches. For example, some embodiments use "set associativity" for managing the storage of cache blocks. For set associativity, the memory in the cache is divided into a number of sets, and the sets are is further divided into a number of ways. As can be seen in FIG. 2, cache 200 includes four ways, with an example way 212 indicated by left-leaning hash marks in the rightmost of the four ways in cache 400. In an example embodiment where the memory in cache 200 is 512 KB in size and 1 KB cache blocks are to be stored in cache 200, each way has storage for 128 cache blocks, and hence each way is divided into 128 sets (with ellipses representing sets not shown in FIG. 2). Each of the sets has a location in each way, with an example set 214 indicated by right-leaning hash marks in the bottommost location in each of the four ways in cache 200. Each set can be used to store cache blocks from a range of memory addresses, and hence the corresponding location in each way for the set can be used to store cache blocks from the range of memory addresses.

In embodiments that use set associativity, upon receiving a cache block to be stored in cache 200, cache controller 204 determines the set in which the received cache block is to be stored. For example, in some embodiments, cache controller 204 compute the set using a hash function for which the input is some or all of the address for the cache block. Cache controller 204 then determines if a location in the set can be used for storing the received cache block without replacing a cache block presently stored in that location (i.e., when there is an available/open location in the set). When a location in the set is available, cache controller 204 stores the cache block into the location.

However, when cache controller 204 determines that there is no location in the set that can be used without replacing a cache block presently stored in that location, cache controller 204 determines a cache block that is to be replaced from among the locations in the set. In other words, when each location in a given set is presently use for storing a cache block, in order to store a new cache block in the set, the cache block in one of the existing locations should be evicted from cache 200 (e.g., written to a next-higher level of cache or to memory and/or overwritten) to make space for the cache block. When determining the cache block that is to be replaced, cache controller 204 can adhere to a replacement policy, which is generally an algorithm or set of rules used to determine the cache block that is to be evicted. In some embodiments, the replacement policy is a first-in-first out policy, in which the first cache block to be stored in a set is evicted, a least-recently-used policy, in which the least recently accessed location in the set is evicted, and/or another replacement policy. After evicting the cache block from the determined location, cache controller 204 can store the received cache block in the location.

As can be seen in FIG. 2, cache controller 204 includes partitioning mechanism 216. Partitioning mechanism 216 is a functional block that performs operations for partitioning the memory in the cache for use by one or more entities and/or sub-entities. As described in more detail below, when partitioning the memory in the cache, partitioning mechanism 216 allocates/assigns portions (e.g., ways, blocks, etc.) of the cache for use by one or more entities and/or sub-entities. For example, assuming an embodiment for which an entity is a GPU, and that the GPU includes a Z/depth unit and a color unit as sub-entities, when the cache is partitioned, a group of K ways in the cache can be allocated/assigned to the GPU, and some of the K ways can be allocated/assigned to each of the Z/depth unit and the color unit as sub-partitions.

In some embodiments, partitioning mechanism 216 uses one or more properties of one or more sub-entities to determine a portion of the cache to be allocated/assigned to one or more sub-entities. For example, partitioning mechanism 216 can use a priority of sub-entity (e.g., set by an operating system or an administrative user, determined at runtime, etc.), an operating mode of the entity/sub-entity/cache, a relationship between the entity/sub-entity/cache, etc.

In some embodiments, partitioning mechanism 216 monitors access patterns of one or more sub-entities and uses the determined access patterns when determining a portion of the cache to be allocated/assigned to one or more sub-entities. In these embodiments, partitioning mechanism 216 monitors one or more aspects of memory accesses for the one or more sub-entities, and then uses the monitored aspects when determining the portion of the cache to be allocated/assigned. For example, in some embodiments, the monitored aspects include one or more of: a number of memory requests made by each monitored sub-entity; a number of hits in the cache encountered while performing memory requests for each monitored sub-entity; a number of misses in the cache encountered while performing memory requests for each monitored sub-entity; an average time between requests for each monitored sub-entity; a way in which memory requests are most often resolved for each monitored sub-entity; and/or other aspects of memory requests for each monitored sub-entity.

Partitioning mechanism 216 records information about the monitored access patterns in access record 218, which includes a counter, a variable, a list, etc. that can be used for recording the information. Partitioning mechanism 216 then subsequently uses the recorded information to determine the access patterns when partitioning the memory in the cache for use by the one or more entities and sub-entities. For example, and continuing the example from above in which an entity is a GPU and the sub-entities are a Z/depth unit and a color unit, partitioning mechanism 216 can maintain a record of a number of memory requests received from each of the Z/depth unit and the color unit in a given time in access record 218 and can use the information about the number of memory requests in access record 218 as a determined access pattern when partitioning the memory in the cache for use by the GPU and the Z/depth unit and color unit.

Cache 200 also includes partition record 220. Partition record 220 is used by cache controller 204 to determine how the cache has been partitioned for entities and/or sub-entities when making accesses in the cache (i.e., which portion of the cache is allocated/assigned to the entity and/or sub-entity). In some embodiments, assuming that the partition is at the granularity of ways in the cache, partition record 220 holds a simple record of a number of ways assigned to each entity and/or sub-entity. In these embodiments, upon receiving a memory request to be resolved in cache 200, cache controller 204 determines, from information in the request, an entity or sub-entity that made the memory request. Cache controller 204 then determines a number of ways allocated to the entity or sub-entity from partition record 220 and processes the memory request accordingly. For example, when the memory request is a request to write data to cache 200, cache controller 204 can use the number of ways allocated to the entity or sub-entity and other entities or sub-entities to determine a way to which the data is permitted to be written.

In some embodiments, partition record 220 includes counters for each entity/sub-entity that are used to keep track of the number of ways in use by each entity/sub-entity (i.e., the number of ways that have had data stored to them by the entity/sub-entity). In some of these embodiments, partition record 220 includes counters for each set. In these embodiments, cache controller 204 uses the counters in partition record to quickly determine the number of ways in use to enable writes of data to cache 200 by entities/sub-entities (see, e.g., FIG. 3).

In some embodiments, a record is not used to keep track of the number of ways in use by each entity/sub-entity (i.e., the number of ways that have had data stored to them by the entity/sub-entity). Instead, the cache controller 204 checks the metadata for each cache block in a set to determine the entity/sub-entity that wrote the data to the locations in the set. For example, cache controller 204 can check tags in the metadata for each location to determine the source of the data.

Although cache 200 is described using certain functional blocks and a particular number of ways, some embodiments include different numbers and/or types of functional blocks and/or ways. For example, cache 200 can include 8, 16, or another number of ways. As another example, in some embodiments, partitioning mechanism 216 is external to cache 200 (but can communicate partitioning information to cache controller 204). In these embodiments, partitioning mechanism 216 can be incorporated in an operating system in computing device 100, can be in processor 102, etc. Generally, the described embodiments can include any functional blocks and/or ways in cache 200 and/or computing device 100 that enable the operations herein described.

In addition, although embodiments are described in which the cache is partitioned at the level of ways, the described embodiments are not limited to partitioning the cache in this fashion. The described embodiments can partition the cache at any level for which a record of partitioning can be maintained (e.g., in partition record 220), including block or page partitioning, where a block or page includes a predetermined chunk of the cache, e.g., a 4 KB chunk, etc.

Moreover, although some embodiments are described using set associativity, other embodiments use different types of associativity. For example, some embodiments use skewed associativity, full associativity, etc.

Entities and Sub-Entities

In the described embodiments, an "entity" can include any circuit, functional block, software application, or combination thereof for which the memory in cache 200 can be partitioned so that one or more entities have protected access to corresponding partitions in cache 200 (i.e., so that a second, third, etc. entity cannot evict a first entity's cache blocks from a first entity's partition). For example, in some embodiments, the entities include CPU cores, GPU cores, lower-level caches, software applications, operating system instances, and/or other functional blocks or software.

In the described embodiments, a "sub-entity" can include any circuit, functional block, software thread, or combination thereof for which the partition for a corresponding entity can be sub-partitioned so that one or more sub-entities have protected access to corresponding sub-partitions (i.e., so that another entity and/or a second, third, etc. sub-entity cannot evict a first sub-entity's cache blocks from a first sub-entity's sub-partition). For example, in some embodiments, the sub-entities include instruction fetch units, hardware prefetchers, instruction execution units, color/depth/texture units, software/operating system threads, and/or other functional blocks or software.

Cache Partitioning

As described above, partitioning mechanism 216 in cache controller 204 is configured to partition cache 200 by allocating portions of the cache for use by one or more entities and/or sub-entities. In the following examples, a two-part partitioning process is described. In the first part of the partitioning process, the cache is partitioned into partitions by allocating ways to entities such as CPUs or GPUs, and in the second part, a partition (as established in the first part) is partitioned into sub-partitions by allocating the ways in the partition to sub-entities of the corresponding entity such as functional blocks in or software threads executing on the CPUs or GPUs. For the following examples, it is assumed that the partitioning occurs at the granularity of ways in the cache. Thus, for these examples, when allocating the portions of the cache to entities and/or sub-entities, partitioning mechanism 216 allocates ways.

In some embodiments, during a partitioning process, partitioning mechanism 216 or another mechanism (e.g., a processor, an operating system, etc.), first allocates one or more ways of the cache to one or more entities. For example, assuming that the entities are processor cores 108 and 110, and that the cache includes six ways, partitioning mechanism 216 can partition the ways by allocating four ways to processor core 108 and two ways to processor core 110.

In some embodiments, when allocating the one or more ways to the one or more entities, partitioning mechanism 216 or the other mechanism use properties of one or more entities and/or access patterns for one or more entities to determine the number of ways to be allocated to the entities. However, in some embodiments, partitioning mechanism 216 or the other mechanism perform other operations to determine the number of ways to be allocated to the entities. For example, partitioning mechanism 216 or the other mechanism may use a preset allocation, may simply divide the ways among the entities, etc.

Partitioning mechanism 216 can subsequently partition one or more partitions in the cache into two or more sub-partitions by allocating one or more of the ways allocated to the corresponding entity to one or more sub-entities. Using the example above, and assuming that the entity is processor core 108 and that the sub-entities are an instruction fetch unit (IFU) and an instruction execution unit (EXU) in processor core 108, partitioning mechanism 216 can allocate three of the four ways allocated to processor core 108 to the IFU and one of the four ways allocated to processor core 108 to the EXU.

As described above, when allocating the one or more of the ways in the partition to one or more sub-entities, partitioning mechanism 216 can use the properties of one or more sub-entities and/or access patterns for one or more sub-entities when determining a number of ways to be allocated to the one or more sub-entities. For example, using the example above, partitioning mechanism 216 could use a relative priority of the IFU and the EXU and/or a count of memory accesses that have been made by the IFU and the EXU to determine the number of ways to be allocated to the sub-entities.

Once allocated, the ways are generally assigned for use by the sub-entities. However, specific ways are not assigned to each sub-entity. For example, a sub-entity that has been allocated four out of eight ways is not allocated the first through fourth ways, but instead is allocated use of any four of the eight ways. Thus, each sub-entity can freely use any ways in cache 200 as part of the allocation; i.e., can store data to the allocated number of ways and can evict cache blocks from the allocated ways to make space for data to be stored in cache 200 by the sub-entity. In other words, when a sub-entity has been allocated X out of Y ways (e.g., four out of six ways, five out of sixteen ways, etc.), the sub-entity has protected access to any X ways in cache 200. Thus, no other sub-entity is permitted to evict the sub-entity's data from any of the X allocated ways, nor is the sub-entity permitted to evict another sub-entity's data from ways allocated to the other sub-entity (i.e., from among the Y-X other ways). However, in these embodiments, a sub-entity can store data to ways beyond the allocated ways, and can evict the sub-entity's own data from the ways beyond the allocated ways, but only when the other sub-entity (i.e., the sub-entity to which the ways are allocated) has not stored data in the locations in the ways (i.e., the ways do not contain valid data from the other sub-entity).

In some embodiments, at some time after partitioning the one or more partitions in the cache into two or more sub-partitions, partitioning mechanism 216 updates/adjusts the allocation of ways in the sub-partitions in one or more partitions in the cache. In these embodiments, after the original configuration of the sub-partitions, partitioning mechanism 216 uses the properties of one or more sub-entities and/or the access patterns for one or more sub-entities to determine an updated portion of the cache to be allocated to the one or more sub-entities and can correspondingly update the allocation for the sub-entities. For example, assuming that the EXU is making an increased number of accesses in cache 200, partitioning mechanism 216 can detect the increase in accesses (using access record 218), and can adjust the allocated ways for IFU and EXU from three ways allocated to IFU and one to EXU to two ways allocated to each of IFU and EXU.

In these embodiments, the update occurs at any time, such as when a sub-entity changes operating modes, at a preset time, or when the access pattern for one or more of the sub-entities meets a given qualification (e.g., falls below a certain number of memory accesses in a preset time, encounters a given number of hits or misses in a predetermined time, etc.). In some embodiments, at least one of the partitioning or the updating of the partitioning occurs after a startup operation for the cache memory has completed and the cache memory is available for performing memory accesses (e.g., at runtime).

In some embodiments, as part of updating the sub-partitions, partitioning mechanism 216 merges some of the sub-partitions. In these embodiments partitioning mechanism 216 determines that a first sub-entity has performed a predetermined number of memory reads in a sub-partition for a second sub-entity. For example, partitioning mechanism 216 can monitor reads in cache 200 by a first thread executing on processor core 108 and can determine that the first thread has performed more than a predetermined number of reads in locations/ways allocated to a second thread. Partitioning mechanism 216 then merges the allocations by enabling the first sub-entity to use a combination of the sub-partition for the first sub-entity and the sub-partition for the second sub-entity for both reads and writes. Using the example above, the first thread would then be able to use locations allocated to the second thread as if they were allocated to the first thread.

In the examples above, all four of the ways in cache 200 are allocated to entities/sub-entities. However, in some embodiments, some or all of the ways (i.e., a portion of the cache) need not be allocated to any entity/sub-entity. For example, only five out of eight ways may be allocated. In these embodiments, all entities/sub-entities are free to use the unallocated portions of cache 200. When an unallocated portion of the cache is used for storing data by a given entity/sub-entity, the data stored in the locations in the unallocated portion by the entity/sub-entity is not protected from eviction as with locations in a portion of the cache that has been allocated to the entity/sub-entity. Thus, another entity/sub-entity can cause the data to be evicted from cache 200.

Although the embodiments are described using memory access patterns and properties for determining the allocation of ways for sub-partition, in some embodiments, other aspects of the sub-entities are used. Generally, any aspect of a sub-entity that enables a reasonable allocation of ways into sub-partitions can be used. In addition, any combination of memory access pattern, property, and/or other aspects can be used, either equally contributing to the determination, or weighted accordingly.

Sub-Entity Prioritization

As described above, in some embodiments, when partitioning one or more partitions in the cache into two or more sub-partitions, partitioning mechanism 216 uses the properties of one or more sub-entities when determining a portion of the partition to be allocated to the one or more sub-entities. One such property is the priority of sub-entity to which the portion of the partition is to be allocated. In some embodiments, a higher-priority sub-entity is preferentially granted a larger portion of the partition than a lower-priority sub-entity.

In these embodiments, the information about priority for each sub-entity can be transmitted to the cache by an operating system, a system administrator, the sub-entity, and/or another sub-entity. The information about priority, when received, can be stored in access record 218.

Characterizing Access Patterns

Recall that, when partitioning one or more partitions in the cache into two or more sub-partitions, partitioning mechanism 216 can use access patterns for one or more sub-entities when determining a portion of the cache to be allocated for each partition. In some embodiments, the access patterns comprise a number of memory requests made by monitored sub-entities and a number of hits or misses in the cache encountered while performing memory requests for the monitored sub-entities. In some embodiments, the number of memory accesses and the number of hits or misses is used to characterize the type of operations being performed by a given sub-entity, which enables a clearer understanding of what memory accesses can be expected from the sub-entity and hence a more appropriate allocation of portions of the cache.

For example, when a thread (the sub-entity) executing on processor core 108 (the entity) performs a large number of memory accesses in cache 200 and accesses a large number of cache blocks, the thread is a candidate for allocation of a larger amount of the partition for processor core 108. An example of when this can occur is when the thread is accessing a 1 MB hash table or data structure with many accesses to items in the table (and corresponding accesses in cache 200) without a particular order, where cache 200 is 8 MB total size.

As another example, when a thread (the sub-entity) on processor core 108 (the entity) performs a large number of memory accesses in cache 200, but accesses a small, active working set, the thread is a candidate for allocation of a smaller amount of the partition for processor core 108. An example of when this can occur is when the thread is accessing a 256 KB hash table or data structure with many accesses to items in the table (and corresponding accesses in cache 200), where cache 200 is 8 MB total size.

As yet another example, when the IFU (the sub-entity) on processor core 108 (the entity) performs a large number of memory accesses in cache 200, but has poor reuse, the IFU is a candidate for allocation of a smaller amount of the partition for processor core 108 (because, e.g., allocating a larger portion would not help with misses in cache 200 due to the poor reuse). An example of when this can occur is when the IFU is accessing instructions in program code in a substantially linear/sequential fashion (and performing corresponding accesses in cache 200).

As a final example, when the EXU (the sub-entity) on processor core 108 (the entity) is compute-bound and therefore performs a small number of memory accesses in cache 200, the EXU is a candidate for allocation of a smaller amount of the partition for processor core 108.

Writing Data to the Cache after Cache Partitioning

FIG. 3 presents three examples of writing data to cache 200 from a sub-entity following the allocation of ways to sub-entities during a partitioning operation in accordance with some embodiments. For each of the examples, it is assumed that: (1) cache 200 includes six ways that are allocated four to processor core 108 and two to processor core 110; (2) cache 200 is further partitioned with three ways from processor core 108's four-way partition allocated to a sub-partition for the IFU, one way from processor core 108's four-way partition allocated to a sub-partition for the EXU; (3) the IFU sent a memory request to cache 200 that requests that corresponding data be stored in cache 200; (4) cache controller 204 used information from the memory request to determine a set into a location in which the cache block is to be stored; and (5)

cache controller 204 has checked partition record 220 to determine the number of ways in cache 200 allocated to the IFU.

Each of the examples in FIG. 3 presents a different state of the same set from cache 200 (where the set includes a location from each way). For each example, the locations in the set contain data from various sources or are empty/invalid. The data from the various sources includes data from the IFU ("DIFU"), data from the EXU ("DEXU"), and data from processor core 110 ("D110"), and the empty/invalid locations are shown as empty ("EPTY"). Because the ways have been allocated as described above, the memory request from the IFU requesting that data be written to the cache is handled differently for each example.

As can be seen below, "locations" in cache 200 are used in describing the examples. However, as previously described, when a sub-entity (e.g., processor core 108) is allocated a given number of ways, the sub-entity is granted protected access to up to the allocated number of ways in cache 200, regardless of the actual/particular way(s) in which data is stored. Thus, the locations shown in FIG. 3 and described below are simply examples of ways that may be used from an allocation to the corresponding sub-entity, and are not intended to limit the described embodiments.

For the first example ("example 1" in FIG. 3), at the start of the write operation, four locations in the set are empty, one location holds data from the IFU, and one holds data from processor core 110. In this case, upon receiving the memory request from the IFU, cache controller 204 determines that there remain two locations from the IFU's allocation to which the data can be written. Cache controller 204 then writes the data to one of the available locations (shown as the second location from the left). Because the data is written to an allocated location, no other sub-entity (or entity) can evict the data from the location. However, the IFU (or cache controller 204, e.g., for coherency operations) can operate on the data freely, including evicting the data, should an eviction be desired.

For the second example ("example 2" in FIG. 3), at the start of the write operation, one location in the set is empty, three locations hold data from the IFU, and two hold data from processor core 110. In this case, upon receiving the memory request from the IFU, cache controller 204 determines that the IFU has already written data to each location in the IFU's allocation, but that one location is empty. Cache controller 204 then writes the data to the available location (shown as the fourth location from the left). Because the data is written to a location that was allocated to the EXU, the EXU can evict the data from the location if the location should be needed for storing data for the EXU (and the IFU cannot evict EXU data from the location, once EXU data is written to the location). However, until the location is needed for storing data for the EXU, the IFU (or cache controller, e.g., for coherency operations) can operate on the data freely in the location, including evicting the IFU's data, should an eviction be desired.

For the third example ("example 3" in FIG. 3), at the start of the write operation, one location in the set holds data from the EXU, three locations hold data from the IFU, and two hold data from processor core 110. Note that this means that each entity/sub-entity is using all of the allocated locations. Thus, there are no available/empty locations to which the IFU data can be written, nor are there allocated locations being used by a non-allocated entity/sub-entity that cache controller 204 might evict to make space for the IFU data. For this reason, cache controller 204 chooses one of the locations that contains data from the IFU (e.g., using a replacement policy), evicts the data from the location, and writes the received data into the location (shown as "DIFU2" in the leftmost location).

By using way allocation to prevent other entities/sub-entities from evicting a sub-entity's data from cache 200 as described for the examples in FIG. 3, the described embodiments can prevent useful data from being evicted from the cache. This can lead to more efficient operation of the cache, the sub-entities, and the entities in the described embodiments.

Processes for Partitioning the Cache

Figure 4:
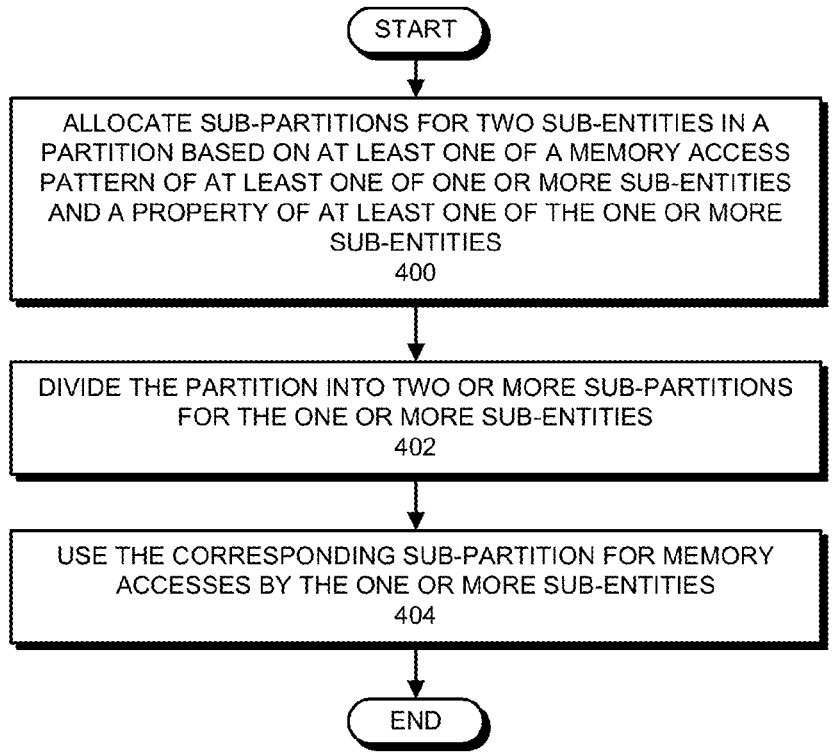
FIG. 4 presents a flowchart illustrating a process for partitioning a cache into sub-partitions in accordance with some embodiments.

FIG. 4 presents a flowchart illustrating a process for partitioning a cache into sub-partitions in accordance with some embodiments. Note that the operations shown in FIG. 4 are presented as a general example of functions performed by some embodiments. The operations performed by other embodiments include different operations and/or operations that are performed in a different order. Additionally, although certain mechanisms in computing device 100 are used in describing the process, in some embodiments, other mechanisms can perform the operations.

For the process shown in FIG. 4, it is assumed that partitioning mechanism 216 (or another mechanism, such as an operating system on computing device 100) has already partitioned the cache into two partitions for two entities. The partitioning includes a first partition for processor core 108 (which is a GPU for this example) and a second partition for processor core 114 (a CPU), with the first partition comprising four ways and the second partition comprising three ways. It is further assumed that processor core 108 includes a texture unit and a color unit as sub-entities.

The process shown in FIG. 4 starts when partitioning mechanism 216 allocates sub-partitions for two sub-entities in a partition in the cache based on at least one of a memory access pattern of at least one of one or more sub-entities and a property of at least one of the one or more sub-entities (step 400). More specifically, partitioning mechanism 216 allocates sub-partitions for the color unit and the texture unit in the partition for processor core 108 based on at least one of a memory access pattern and a property of at least one of the color unit; the texture unit; and one or more other sub-entities in computing device 100 (e.g., a software thread executing on processor core 108, etc.).

As an example of the use of the memory access pattern, if the color unit is making a larger number of memory accesses that hit in cache 200 than the texture unit, the color unit can be allocated a larger sub-partition than the texture unit (e.g., the color unit can be allocated two of processor core 108's four ways, and the texture unit can be allocated one of processor core 108's four ways). As an example of the use of the property of the sub-entity, assuming that a priority of the color unit has been set higher than a priority of the texture unit, the color unit can be allocated a larger sub-partition than the texture unit (e.g., the color unit can be allocated three of processor core 108's four ways, and the texture unit can be allocated one of processor core 108's four ways). In some embodiments, partitioning mechanism 216 can use a combination of the memory access pattern and the properties, either equally, or in accordance with some form of weighting for each factor.

Note that the two sub-entities for which sub-partitions are allocated and the one or more sub-entities (on whose memory access pattern and property the allocation is based) may, but are not obligated to, be the same sub-entities. In some embodiments, partitioning mechanism 216 bases the allocation of sub-partitions for given sub-entities on the properties and memory access patterns of any useful combination of sub-entities.

When allocating two or more sub-partitions based on the memory access pattern, partitioning mechanism 216 can determine memory access pattern(s) for the sub-entities using access record 218. Recall that memory access record 218 is a record of memory accesses made by one or more sub-entities that is maintained by cache controller 204 and/or partitioning mechanism 216. Access record 218 can include any data useful for determining memory access patterns, including a count of memory accesses, a count of hits/misses in cache 200, and/or other memory access data.

In some embodiments, when determining memory access patterns, partitioning mechanism 216 characterizes memory accesses made by a sub-entity as one of a predetermined number of memory access patterns. For example, when a sub-entity is making a large number of memory accesses that are linear (proceeding from memory address to memory address in a sequential way), and is encountering a large proportion of misses in cache 200, partitioning mechanism 216 can characterize the access pattern as a "streaming" access pattern. For the streaming memory access pattern, the allocation of ways to the sub-entity can be smaller than for other memory access patterns. In these embodiments, any number of access patterns can be used based on various aspects of memory accesses (total accesses, accesses per period, number of hits/misses, where accesses are occurring, type of data accessed, latency of accesses, type of operation performed by the sub-entity, operating mode of the cache or entity, etc.). Additionally, in these embodiments, the memory access pattern can be initially established as a first memory access pattern and then dynamically updated to a second, third, etc. memory access pattern as more memory accesses are made by a sub-entity.

Returning to FIG. 4, partitioning mechanism 216 then divides the partition into two or more sub-partitions for the one or more sub-entities (step 402). For example, during this operation, partitioning mechanism 216 assigns ways to each of the color unit and the texture unit in accordance with the above-described allocation. During this operation, partitioning mechanism 216 can update partition record 220 so that cache controller 204 can use the partition record to determine the number of ways in the sub-partition for each of the color unit and the texture unit in processor core 108.

Next, cache controller 204 uses a corresponding sub-partition for memory accesses by the one or more sub-entities (step 404). In these embodiments, using a corresponding sub-partition for memory accesses by the one or more sub-entities comprises protecting cache blocks written to the sub-partition by the corresponding sub-entity. This includes preventing other sub-entities from evicting a given sub-entity's cache blocks from the sub-entity's sub-partition.

Figure 5:
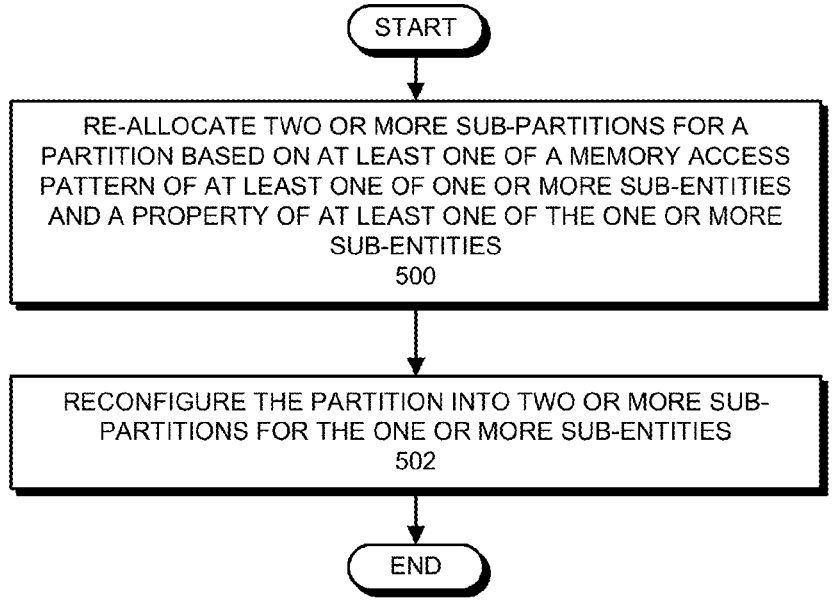
FIG. 5 presents a flowchart illustrating a process for updating the partitioning of a cache in accordance with some embodiments.

FIG. 5 presents a flowchart illustrating a process for updating the sub-partitioning of a cache in accordance with some embodiments. Note that the operations shown in FIG. 5 are presented as a general example of functions performed by some embodiments. The operations performed by other embodiments include different operations and/or operations that are performed in a different order. Additionally, although certain mechanisms in computing device 100 are used in describing the process, in some embodiments, other mechanisms perform the operations.

For the process shown in FIG. 5, it is assumed that the operations of FIG. 4 have occurred. Thus, a partition for processor core 108 has already been divided into two or more sub-partitions for the color unit and the texture unit.

The process shown in FIG. 5 starts when partitioning mechanism 216 re-allocates two or more sub-partitions for a partition in the cache based on at least one of a memory access pattern of at least one of one or more sub-entities and a property of at least one of the one or more sub-entities (step 500). Generally, this operation is an update of the previously-established allocation (see step 400 in FIG. 4) that is made after the earlier allocation as a dynamic update of the sub-partitioning of cache 200. By performing this update, these embodiments keep the sub-partitioning adjusted in accordance with changes in runtime memory access patterns and sub-entity properties (e.g., changes in priority of a sub-entity, etc.).

Partitioning mechanism 216 then reconfigures (re-divides) the partition into two or more sub-partitions for the one or more sub-entities (step 502). During this operation, partitioning mechanism 216 can update partition record 220 so that cache controller 204 can use the partition record to determine the number of ways in the sub-partition for each of the color unit and the texture unit in processor core 108.

Virtualization of Sub-Entities

Some embodiments include a virtualization mechanism (not shown) in cache 200 and/or in the entity/sub-entity that emulates sub-entities to create virtual sub-entities for the above-described partitioning operation. In these embodiments, the virtualization mechanism alters memory requests from given sub-entities to make a request from one or more sub-entities within an entity appear to come from separate sub-entities (or separate entities). For example, memory requests from an IFU and an EXU processor core 108 could be altered to make the requests appear (at least to partitioning mechanism 216) as if they are sourced from separate and different processor cores. In these embodiments, the above-described partitioning into partitions and sub-partitions may be performed using virtual entities/sub-entities.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for operating a cache memory, comprising:
   in a cache controller in the cache memory, performing operations for:
   partitioning the cache memory into two or more partitions, each partition being allocated for use by a corresponding different entity;
   partitioning one or more of the partitions in the cache memory into two or more sub-partitions for one or more sub-entities of a corresponding entity; and
   using a corresponding sub-partition for memory accesses by the one or more sub-entities by permitting any sub-entity to store cache blocks in available locations in any sub-partition in the cache, but preventing a given sub-entity from evicting cache blocks from an other sub-entity's sub-partition that were stored there by the other sub-entity.

2. The method of claim 1, wherein the method further comprises:
   allocating the two or more sub-partitions for a corresponding partition based on at least one of:
   a memory access pattern of at least one of the one or more sub-entities; and
   a property of at least one of the one or more sub-entities.

3. The method of claim 2, wherein the method further comprises:

determining that a first sub-entity has performed a predetermined number of memory reads in a sub-partition for a second sub-entity; and enabling the first sub-entity to use a combination of the sub-partition for the first sub-entity and the sub-partition for the second sub-entity.

4. The method of claim 2, wherein the method further comprises, at least one predetermined time after partitioning one or more of the partitions in the cache memory into two or more sub-partitions:

updating the allocation of the two or more sub-partitions for a corresponding partition based on at least one memory access pattern of the one or more sub-entities.

5. The method of claim 4, wherein at least one of the partitioning or the updating of the allocation of the two or more sub-partitions occurs after a startup operation for the cache memory has completed and the cache memory is available for performing memory accesses.

6. The method of claim 2, wherein each entity is selected from the group consisting of:

a core in a central processing unit (CPU); and a core in a graphics processing unit (GPU).

7. The method of claim 6, wherein the sub-entities comprise, in a corresponding entity:

one or more functional blocks; or one or more software threads operating on the entity.

8. The method of claim 2, wherein allocating the two or more sub-partitions for the corresponding partition based on a memory access pattern of at least one of the one or more sub-entities comprises:

for each of the one or more sub-entities, determining at least one of a number of memory accesses performed by the sub-entity and a number of misses encountered by the sub-entity; and based on the determined at least one of the number of memory accesses and the number of misses for each of the one or more sub-entities, setting a sub-partition size for each of the two or more sub-partitions.

9. The method of claim 8, wherein the method further comprises maintaining at least one of a first record of memory accesses made in the cache memory for a given sub-entity and a second record of misses that occur in the cache memory for memory accesses for the given sub-entity; and wherein determining the at least one of the number of memory accesses performed by the given sub-entity and the number of misses encountered by the given sub-entity comprises obtaining the number of memory accesses and the number of misses from the corresponding first or second record.

10. The method of claim 8, wherein the method further comprises using the at least one of the number of memory accesses and the number of misses to characterize the memory access pattern of the given sub-entity.

11. The method of claim 10, wherein setting the sub-partition size for the given sub-entity comprises setting the sub-partition size for the given sub-entity based on the characterization of the memory access pattern for the given sub-entity.

12. An apparatus, comprising:

a cache memory; and a cache controller configured to:

partition the cache memory into two or more partitions, each partition being allocated for use by a corresponding different entity;

partition one or more of the partitions in the cache memory into two or more sub-partitions for one or more sub-entities of a corresponding entity; and use a corresponding sub-partition for memory accesses by the one or more sub-entities by permitting any sub-entity to store cache blocks in available locations in any sub-partition in the cache, but preventing a given sub-entity from evicting cache blocks from an other sub-entity's sub-partition that were stored there by the other sub-entity.

13. The apparatus of claim 12, wherein, when partitioning the one or more partitions into the two or more sub-partitions, the cache controller is configured to:

allocate the two or more sub-partitions for a corresponding partition based on at least one of:

a memory access pattern of at least one of the one or more sub-entities; and a property of at least one of the one or more sub-entities.

14. The apparatus of claim 13, wherein, when allocating the two or more sub-partitions for the corresponding partition based on a memory access pattern of at least one of the one or more sub-entities, the cache controller is configured to:

for each of the one or more sub-entities, determine at least one of a number of memory accesses performed by the sub-entity and a number of misses encountered by the sub-entity; and based on the at least one of the number of memory accesses and the number of misses for each of the one or more sub-entities, set a sub-partition size for each of the two or more sub-partitions.

15. The apparatus of claim 13, wherein the cache controller is configured to:

determine that a first sub-entity has performed a predetermined number of memory reads in a sub-partition for a second sub-entity; and enable the first sub-entity to use a combination of the sub-partition for the first sub-entity and the sub-partition for the second sub-entity.

16. The apparatus of claim 13, wherein, at least one predetermined time after partitioning one or more of the partitions in the cache memory into two or more sub-partitions, the cache controller is configured to:

update the allocation of the two or more sub-partitions for a corresponding partition based on at least one memory access pattern of the one or more sub-entities.

17. The apparatus of claim 13, wherein each entity is selected from the group consisting of:

a core in a central processing unit (CPU); and a core in a graphics processing unit (GPU).

18. The apparatus of claim 17, wherein the sub-entities comprise, in a corresponding entity:

one or more functional blocks; or one or more software threads operating on the entity.

19. A computer-readable storage medium storing instructions that, when executed by a computing device, cause the computing device to perform a method for operating a cache memory, the method comprising:

partitioning the cache memory into two or more partitions, each partition being allocated for use by a corresponding different entity;

partitioning one or more of the partitions in the cache memory into two or more sub-partitions for one or more sub-entities of a corresponding entity; and using a corresponding sub-partition for memory accesses by the one or more sub-entities by permitting any sub-entity to store cache blocks in available locations in any sub-partition in the cache, but preventing a given sub-entity from evicting cache blocks from an other sub-entity's sub-partition that were stored there by the other sub-entity.

20. The computer-readable storage medium of claim 19, wherein the method further comprises:
- allocating the two or more sub-partitions for a corresponding partition based on at least one of:
  - a memory access pattern of at least one of the one or more sub-entities; and
  - a property of at least one of the one or more sub-entities.

21. The computer-readable storage medium of claim 20, wherein allocating the two or more sub-partitions for the corresponding partition based on a memory access pattern of at least one of the one or more sub-entities comprises:
- for each of the one or more sub-entities, determining at least one of a number of memory accesses performed by the sub-entity and a number of misses encountered by the sub-entity; and
- based on the determined at least one of the number of memory accesses and the number of misses for each of the one or more sub-entities, setting a sub-partition size for each of the two or more sub-partitions.

* * * * *